Patented July 30, 1935

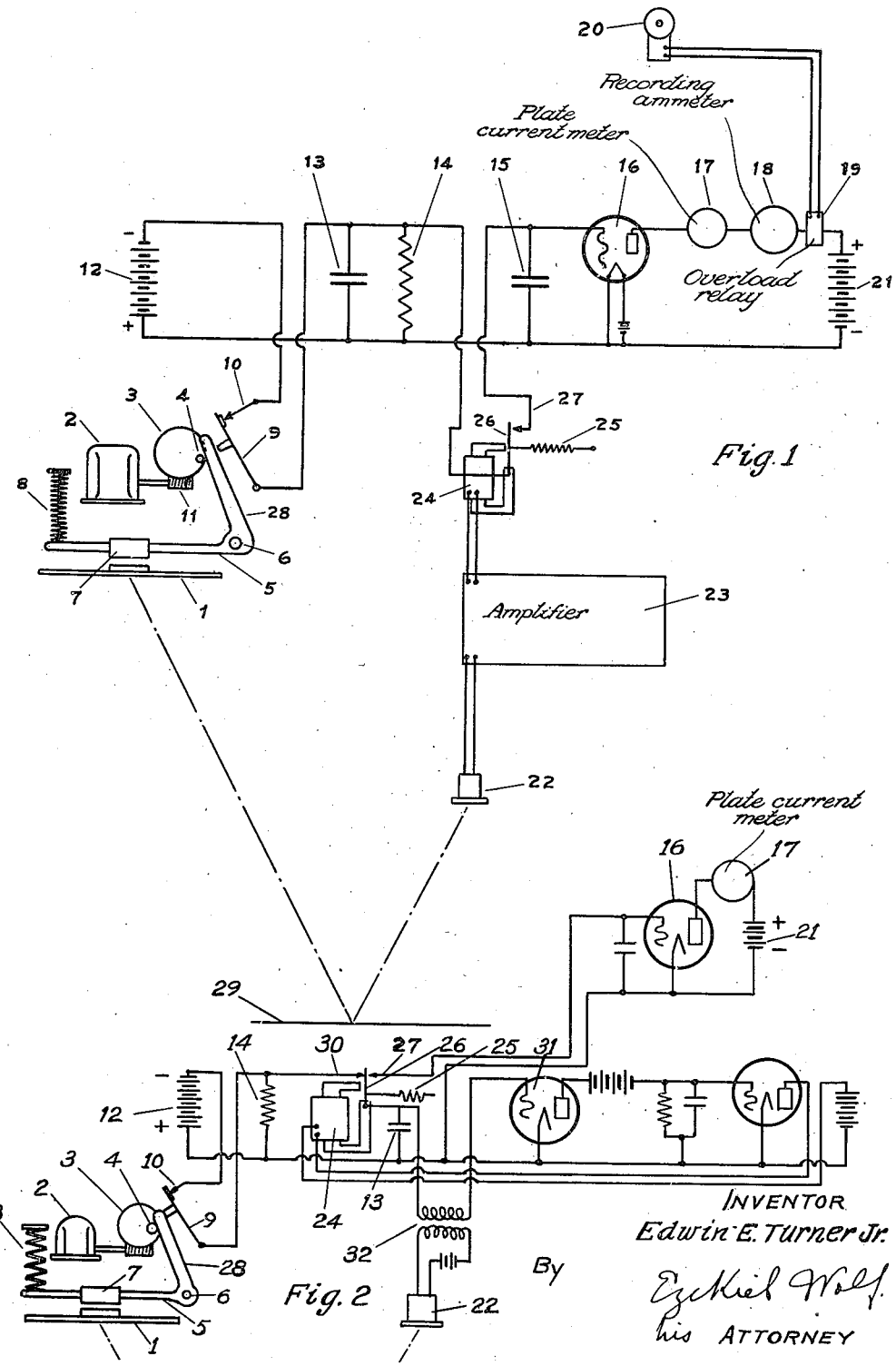

2,009,459

UNITED STATES PATENT OFFICE 2,009,459

DISTANCE AND DEPTH FINDING

Edwin E. Turner, Jr., West Roxbury, Mass., assignor to Submarine Signal Company, Boston, Mass., a corporation of Maine Application July 29, 1929, Serial No. 381,970

11 Claims. (Cl. 177—386)

The present invention relates to a system for determining distances and depths by measuring the time interval between the emission of a sound or energy impulse and the return of its echo.

This has been done in the prior art in a number of different ways, most of which have been successful. Perhaps the most successful of these systems are those in which the sound impulse is emitted when a rotating indicator is at a zero position with reference to a scale and the incoming echo which is received by a sound receiver operates the indicator, thereby indicating with reference to the scale the distance or depth. In these systems the sound emitter is usually controlled by the rotating indicator, or something connected to it. Further, this method demands that the indicator be rotating continuously and that the speed be maintained constant. While it has been found to be possible to do this satisfactorily and without much trouble, it is, nevertheless, true that the indicator device and the mechanism to control the proper times of sound emission have been somewhat large and expensive.

In addition, while these systems usually give a substantially continuous indication of distance or depth, since the periodic depth or distance indications are very close together (about a second apart), nevertheless the operator must watch for one of these indications to know what the depth or distance is.

In the present system, the indicator does not move continuously, but assumes the correct position of depth with reference to a scale and remains at that position until the depth changes, at which time it moves to its new and proper position. The apparatus is much simplified over that of the prior art and, in addition gives an absolute, continuous indication at all times.

In preference to having the indicator control the times of emission of the sound impulse, in the present invention the sound emitter operates independently and at each emission sets the time measuring circuit in operation. This time measuring circuit is entirely electrical, has no moving parts, and operates an indicator, which likewise moves only with a change of successive time measurements.

The invention is applicable to all types of distance measurement or measurement of time intervals, but finds perhaps its greatest and most important application to depth sounding and height measurement, the former in the water with an impact sound emitter and a hydrophone as a receiver, and the latter with similar apparatus designed for use in air.

The invention will now be described in detail in connection with the drawing, in which Figure 1 shows an embodiment of the invention and Figure 2 a modification.

In the drawing, the sound or energy impulse is emitted by an impact excitation of the diaphragm 1 by the striking of the diaphragm by the hammer 7 at the end of the arm 5 of the lever pivoted at 6. The hammer is operated by a motor 2 turning by means of a worm 11 the cam 3, which has a pin 4 extending perpendicularly from the cam surface. The pin 4 catches under the lower side of the arm 28 of the pivoted lever and raises the arm against the force of the spring 8. When the pin 4 has passed beyond the arm 28, the arm is released and the spring 8 forces the hammer 7 against the boss of the diaphragm 1, thereby emitting a sound impulse. The sound travels to the surface 29, is reflected and picked up by the hydrophone or receiver 22, which may be amplified by the amplifier 23.

The amplifier is preferably of the type disclosed in my copending United States application Serial No. 270,660, filed April 17, 1928, which is very desirable for operating the relay 24. In the drawing this is shown as a mechanical relay, but it may be of any other suitable type. The circuit of application Serial No. 270,660 furnishes a definite and uniform collapsing current for all signals received, so that the relay 24 will have a uniform operation, particularly with regard to time lag, which is important, as will be explained later.

When the arm 28 is released, the contact lever 9 follows with it and is so set that the contact between 9 and 10 is broken at the time when the hammer 7 strikes the diaphragm 1. The battery 12, which must be of standard and substantially unvarying voltage, or one on which the voltage is controllable to obtain a definite voltage, before the opening of the contact between 9 and 10 keeps the condenser 13 at a definite potential. After the circuit is broken, the condenser 13 discharges through the constant resistance 14 at a rate determined by the formula $$V_t = V_o e^{\frac{-t}{cR}}$$

where $V_o$ is the initial voltage on the condenser 13, $c$ the capacity of the condenser 13 and $R$ the resistance of the resistance 14. "$e$" is the logarithmic constant, "$t$" is the time measured from the beginning of the opening of the circuit and $V_t$ is the potential on the condenser 13 at the time $t$.

From the above it will be noted that the time interval "$t$" is measurable by the voltage $V_t$ on the condenser 13. The condenser 13 continues to discharge as the sound impulse travels to the surface 29 and is reflected and received by the hydrophone 22, at which instant the receiving circuit operates, causing the relay 24 to release the arm 26, which flies back, due to the pull of the spring 25 making a contact between 26 and 27.

This, it will be noted from the drawing, places the condenser 15 at the same potential as the condenser 13 and charges the grid of the tube 16 with the same potential with respect to the filament.

The relay 24 does not remain in this position. It is immediately drawn back, breaking the contact between 26 and 27, thus isolating the charge on the condenser 15 and on the grid of the tube 16. The vacuum tube 16 has a definite plate current dependent upon the voltage of the battery 21 and the grid potential of the tube. With a constant plate voltage the current varies solely with the grid potential, so that the plate current may be made a function of the grid voltage, which in turn is dependent upon the charge on the condenser 13 at the time the contact between 26 and 27 is closed. Since the charge on the condenser 13 is a function of the time counted from the emission of the sound signal causing the opening of the contact between 9 and 10, the charge on the condenser 13 at the time the contact between 26 and 27 is closed by the returning echo is a measure of the time interval between the emission of the sound and the receipt of the echo. This charge is measured by the plate current flowing through the vacuum tube 16 by means of the ammeter 17 and the recording ammeter 18. If it is desired, a relay 19, operated on a definite current value, may be used to operate the alarm 20.

When the echo has arrived closing the contacts of the relay 24 momentarily, the needle of the meter 17 will assume a definite position dependent upon the potential of the grid 16. The contact opening instantly, this charge remains on the grid 16, since it cannot leak off, and the needle of the meter 17, therefore, keeps its position.

In effect, the circuit including the vacuum tube 16 and the meter 17 may be called a vacuum tube voltmeter, since it measures the potential on the grid of the tube 16.

The operation is repeated each time a signal is emitted. If the depth should change, the charge on the condenser 13 would be different at the time the relay contacts were closed and thus the grid potential would be changed and the plate current in the tube 16. The needle of the meter 17 would then assume a different position corresponding to the newly measured depth. In other words, the position of the needle of the meter 17 would not change until a new sounding indicated a different depth. The last sounding depth or distance measurement can therefore be read at any time from the position of the needle of the meter 17.

The grid of the tube 16 is used as a floating grid since it is free from the ordinary plate current in the circuit and assumes a potential dependent only upon the charge that is applied to it. It should also be noted that this grid is brought to the proper potential not through a single charge of the condenser 15, but because of successive periodic operations which bring the grid alternately to its proper value. The condenser 15 is comparable in size or larger than the condenser 13 used in the timing circuit, but the condenser 13 is not discharged to any appreciable extent across the condenser 15 because of the fact that the potential is applied to the condenser 15 only for a very short time. In actual practice soundings are made at intervals of about one second, and under this manner of operation it is necessary to have probably four or five soundings before the true sounding is established. When the condenser 15 is once charged to the potential established by a previous sounding, the following measurement is not so far different but what the correct reading is currently established.

It should be noted that in the present system the direct signal proceeding directly from the diaphragm 1 to the hydrophone 22 cannot cause a great disturbance of the readings, as the echo always follows and corrects the potential of the grid 16. Even though the direct signal will operate the meter 17, it will be only for such a short time that for the most part the meter will always read the depth. It should also be noted that operation by the direct signal will not make the circuit inoperative when the echo comes in, as would be the case if the effect of producing the indication caused a discontinuance of the discharge of the condenser 13.

Figure 2 shows a slight modification of the circuit of Figure 1 in which the point of measurement is determined not when contact is made between 26 and 27 but when the contact between 26 and 30 is opened. In this manner the time element of the relay is substantially eliminated as the opening of the circuit is practically instantaneous.

The feature of the circuit shown in Figure 2 has another advantage. In sounding by the echo method the echo is usually powerful in shallow water and weak in deep water. The receiving circuits heretofore used had to be sensitive enough for deep water and when so adjusted were often too sensitive for shallow water, with the result that direct signals and other noises incidental to the emission of the signal often caused the operation of the indicator and thereby produced erroneous readings.

In the system shown in Figure 2 this is eliminated by making the circuit of such a sensitivity that as the time interval necessary for the echo to return becomes greater the sensitivity of the receiving circuit becomes greater. In deep water, therefore, the circuit is more sensitive than in shallow water.

In the operation of this circuit it may be noted that the transformer does not change the potential on the condenser 13 since the filament grid circuit of the tube 31 has practically an infinite impedance and therefore there is no way of applying the voltage on the secondary of the transformer 32 across the condenser 13. The two potentials, that across the condenser 13 and that across the secondary of the transformer 32, are always in series.

As in Figure 1, when the sound is emitted the contact between 9 and 10 is broken and the charge accumulated on the condenser 13 is allowed to discharge through the resistance 14. At the same time, however, the condenser 13 is connected continually between the grid and the filament of the tube 31, which is the first tube of the receiving circuit. Across the hydrophone 22 is a transformer 32 which has its secondary connected in the filament grid circuit of the tube 31.

The impulse received by the hydrophone 22 is impressed upon the grid of the tube 31 through the transformer 32 and the operation of the circuit depends in the first instance on whether the potential generated by the received signal sufficiently overcomes the charge on the grid placed there by the condenser 13 to allow the circuit to operate. If the signal returns immediately, as when the direct signal travels to the receiver without being reflected, the charge on the condenser 13 will not appreciably have leaked off.

In this way the grid of the tube 31 is highly negative and the direct signal, even though powerful, will not generate sufficient voltage to overcome this high negative charge and operate the circuit.

On the other hand, if the water were deep the charge on the condenser 13 will have appreciably leaked off and the grid of the tube 31 will be less negative so that a smaller signal voltage will operate the circuit. The circuit beyond the tube 31 is like that shown and described in my copending application Serial No. 270,660 above referred to, with the exception that the relay 24 replaces the indicating neon tube. The echo passing through the circuit energizes the relay 24 and opens the contact between 30 and 26, thereby isolating the charge on the condenser 13. The instant of the opening of the contact 30 and 26 fixes the measurement of the time interval as the condenser 13 no longer loses its charge after the opening and, therefore, whatever the time elapsing until 26 and 27 contact, the time measurement is unaffected. The making of the contact between 26 and 27 places the charge of the condenser 13 on the grid of the tube 16, which produces the indication on 17, as explained above.

It should be noted that the sensitivity of the receiving circuit is a function of the time interval between the emission of the direct signal and the receipt of the echo, and that the deeper the water, the more sensitive the receiving circuit becomes.

Having now described my invention, I claim:

1. In a system for measuring depths by the echo method in which periodically repeated sound signals are produced at close intervals of time, a sound receiving system including a sound receiver, a valve receiving circuit having a valve with anode, cathode and a control grid, indicating means in the anode-cathode circuit adapted to give a continuous indication which varies as a function of grid potential, means providing a potential varying in intensity from the time the impulse is emitted and means operated by the receiver on the receipt of an echo for impressing on said control grid said varying potential for establishing a bias for the following echo signal.

2. In a system for measuring depths by the echo method in which periodically repeated sound signals are produced at close intervals of time, a sound receiving system including a sound receiver, a valve receiving circuit having a valve with anode, cathode and a control grid, indicating means in the anode-cathode circuit adapted to give a continuous indication which varies as a function of grid potential, means providing a potential varying in intensity with the depth being measured and means for impressing on said control grid periodically said potential as a varying bias, said last-mentioned means being operated by the sound receiver to impress the said potential upon the control grid upon the receipt of the sound impulse by the sound receiver.

3. In a system for measuring depths, in which a sound signal is periodically produced at close time intervals, a sound receiving system including a sound receiver, means including a potential source varying definitely as a time function from the periodic production of the sound signal, means for measuring the magnitude of the potential source and means operated by the sound receiver for impressing momentarily periodically upon receipt of the echo the potential source upon the measuring means.

4. In a system for measuring depths, in which a sound signal is periodically produced at close time intervals, a sound receiving system including a sound receiver, means including a potential source varying definitely as a time function from the periodic production of the sound signal, means for measuring the magnitude of the potential source and means operated by the sound receiver for impressing periodically for momentary intervals the potential source on the measuring means to establish the potential to be measured.

5. In a system for measuring depths, means for periodically producing a sound signal, a sound receiving system including a sound receiver, means including a potential source varying definitely as a time function from the periodic production of the sound signal, means for measuring the magnitude of the potential source including a vacuum tube circuit having a vacuum tube with a control grid, a cathode and anode, said control grid being coupled to said cathode through a condenser, means periodically operated by the receiving system on the receipt of the reflected echo to impress the potential source upon said control grid to establish by successive impressions a potential on the grid corresponding to the time measuring the depth and means in said measuring circuit for continually indicating the potential on said grid.

6. In a system for measuring depths in which periodic sound signals are sent at close intervals by the elapsed time method between the sending of an impulse and the receipt of the reflected echo, means for measuring the time interval comprising an electric circuit including means providing a predetermined electrical potential for the circuit, means varying as a function of time when the predetermined potential is withdrawn from the circuit, means for withdrawing the same synchronously with the sending of the impulse, means for receiving the reflected echo and means operated thereby, marking the end of the elapsed time to be measured, including a thermionic tube circuit having, as an input control, a thermionic tube with a free grid with means for connecting the grid upon receipt of the echo to said electrical potential and means operated by the electrical potential assumed by said grid to indicate the measure of the time interval as a function of the electrical potential.

7. In a system for measuring depth by the elapsed time method between the sending of an impulse and the receipt of a reflected echo, means for measuring the time interval including a condenser and means for discharging the condenser at a known rate from the beginning of the time interval marked by the sending of the impulse, means for receiving the reflected echo and means operated thereby for measuring the potential of the condenser at the end of the time interval to be measured as a function of the time interval, including a vacuum tube voltmeter having a floating grid and means operated by the receiver upon receipt of the reflected echo for momentarily connecting the condenser to the grid and means for recharging the condenser before the sending of the impulse.

8. In a system for measuring depths by the elapsed time method between the sending of an impulse and the receipt of the reflected echo, means for measuring the time interval comprising an electric circuit including means providing a predetermined electrical potential for the circuit, means varying as a function of the time when the predetermined potential is withdrawn from the circuit, means for sending a signal impulse periodically at short intervals, means for withdrawing the predetermined potential synchronously with the sending of the impulse, means for receiving the reflected echo and means operated by the receiver for marking the end of the elapsed time to be measured including a thermionic tube circuit having as an input control a thermionic tube with a free grid with means for connecting the grid upon receipt of the echo to said electrical potential and means operated upon the application of said potential to said grid to indicate the measure of the time interval as a function of the electrical potential, said transmitted impulses being produced periodically and at sufficiently short periods so that the charge on the grid remains substantially constant between the period of echo reception and the time that the next impulse is sent.

9. In a system for depth measurement, a time measuring circuit including means establishing an initial potential at the beginning of the interval to be measured, means for causing the potential to vary thereafter as a function of time from the moment of establishment of the potential, and means for measuring the potential at the end of the measuring interval including a vacuum tube voltmeter having a floating grid and means for applying the potential intermittently at close time intervals to said floating grid at that moment.

10. In a system for depth measurement, a time measuring circuit including means establishing an initial potential at the beginning of the interval to be measured, means for causing the potential to vary thereafter as a function of time from the moment of establishment of the potential, and means for measuring the potential at the end of the measuring interval including a vacuum tube voltmeter having a floating grid and means for applying the potential intermittently at close time intervals to said floating grid at that moment comprising a relay adapted to make momentary contact between the potential source and the floating grid.

11. In a system for measuring depths by the echo method in which periodically repeated sound signals are produced at close intervals of time, a sound receiving system including a sound receiver, a valve receiving circuit having a valve with anode, cathode and a control grid, indicating means in the anode-cathode circuit adapted to give a continuous indication which varies as a function of grid potential, means providing a potential varying in intensity as a function of the depth being measured and means for impressing on said control grid periodically said potential as a varying bias, said last-mentioned means being operated by the sound receiver to impress the said potential upon the control grid upon the receipt of the sound impulse by the sound receiver.

EDWIN E. TURNER, Jr.